(12) United States Patent
Domingues et al.

(10) Patent No.: US 10,617,982 B2
(45) Date of Patent: Apr. 14, 2020

(54) FILTER DEVICE

(71) Applicant: Mahle International GmbH, Stuttgart (DE)

(72) Inventors: Tadeu Geraldo Domingues, Sao Paulo (BR); Felipe Ferrari, Sao Paulo (BR); Luiz C. Fritz, Sao Paulo (BR); Matthias Gaenswein, Esslingen (DE); Uli Haeussermann, Fellbach (DE); Josef Rutha, Rudersberg (DE); Fernando Jun Yoshino, Sao Paulo (BR)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 16/302,913

(22) PCT Filed: Apr. 18, 2017

(86) PCT No.: PCT/EP2017/059109
§ 371 (c)(1),
(2) Date: Nov. 19, 2018

(87) PCT Pub. No.: WO2017/198408
PCT Pub. Date: Nov. 23, 2017

(65) Prior Publication Data
US 2019/0275451 A1 Sep. 12, 2019

(30) Foreign Application Priority Data

May 20, 2016 (DE) .......................... 10 2016 208 789

(51) Int. Cl.
*B01D 35/30* (2006.01)
*B01D 29/21* (2006.01)
(Continued)

(52) U.S. Cl.
CPC ............. *B01D 35/30* (2013.01); *B01D 29/21* (2013.01); *B01D 29/96* (2013.01); *B01D 35/153* (2013.01);
(Continued)

(58) Field of Classification Search
CPC ........ B01D 35/30; B01D 29/96; B01D 29/21; B01D 2201/295; B01D 2201/4007;
(Continued)

(56) References Cited

U.S. PATENT DOCUMENTS

| 5,876,600 A * | 3/1999 | Matsubara ........... B01D 35/153 210/443 |
| 2003/0141235 A1* | 7/2003 | Stankowski ........... B01D 35/30 210/232 |
| 2011/0147297 A1 | 6/2011 | Core et al. | |

FOREIGN PATENT DOCUMENTS

| EP | 1690581 B1 | 8/2007 |
| JP | H0685007 U | 12/1994 |
| WO | 2015/173624 A1 | 11/2015 |

OTHER PUBLICATIONS

English abstract for EP-1690581.

\* cited by examiner

*Primary Examiner* — David C Mellon
(74) *Attorney, Agent, or Firm* — Fishman Stewart PLLC

(57) ABSTRACT

A filter device may include a filter housing cup, a filter head, and a ring filter element arranged in the filter housing cup. The ring filter element may include an upper end plate on which at least two radially outward projecting bayonet wings are arranged which interact with a plurality of recesses disposed in the filter housing cup. The plurality of recesses may respectively define an undercut contour and a first end position of an associated bayonet wing guided therein. At least two driving elements may be arranged on
(Continued)

the upper end plate. At least two ramps and two stops may be arranged on the filter head such that, when fitting the filter device, the at least two driving elements slide on the at least two ramps to the two stops and press the at least two bayonet wings into the undercut contour of an associated recess.

20 Claims, 4 Drawing Sheets

(51) Int. Cl.
 *B01D 29/96* (2006.01)
 *B01D 35/153* (2006.01)
(52) U.S. Cl.
 CPC .. *B01D 2201/295* (2013.01); *B01D 2201/303* (2013.01); *B01D 2201/4007* (2013.01); *B01D 2201/4015* (2013.01)
(58) Field of Classification Search
 CPC .......... B01D 2201/303; B01D 2201/40; B01D 2201/4023; B01D 35/153; B01D 29/33; B01D 29/333; B01D 29/35; B01D 29/353; B01D 29/114; B01D 29/117; B01D 29/11; B01D 35/005; B01D 35/16; B01D 35/18; B01D 35/306; B01D 2001/4046; B01D 2201/4053; B01D 35/4015; B01D 35/4046; B01D 35/4053; B01D 35/4061; B01D 2201/291; B01D 2201/347; B01D 2201/24; B01D 2201/4015; F02M 37/22; F02M 37/24; F02M 37/26; F02M 37/28; F02M 37/30; F02M 37/32; F02M 37/42
 See application file for complete search history.

FILTER DEVICE

CROSS-REFERENCE TO RELATED APPLICATIONS

This application claims priority to International Patent Application No. PCT/EP2017/059109, filed Apr. 18, 2017, and German Patent Application No. DE 10 2016 208 789.4, filed on May 20, 2016, the contents of both of which are hereby incorporated by reference in their entirety.

TECHNICAL FIELD

The present invention relates to a filter device having a filter housing cup and a filter head, wherein a ring filter element is arranged in the filter housing cup.

BACKGROUND

A generic filter device with a filter housing cup and a filter head is known from US 2011/0147297 A1, wherein a ring filter element with an upper and a lower end plate is arranged in the filter housing cup. At the face end the upper and lower end plates in this case enclose a filter material arranged therebetween. At least two radially outwardly projecting bayonet wings are arranged on the upper end plate of the ring filter element, which bayonet wings interact with recesses arranged on the filter housing cup in the manner of a bayonet catch.

A liquid filter system for an internal combustion engine having a beaker-shaped housing is known from EP 1 690 581 B1, which beaker-shaped housing is detachably connectable to a receiving head, wherein a filter element is arranged in the housing. The housing in this case is provided with first form-fitting elements which extend over at least part of the outer circumference of the housing and/or the lower edge thereof. The form-fitting elements in this case are each interrupted by at least one axially extending recess, wherein the filter element has a liquid-tight casing that is provided with second form-fitting elements on its outside and/or on its lower edge which can be used when inserting the filter element in the housing into the recess in the first form-fitting elements.

As a general rule, when replacing suspended filters, it is desirable for these to be capable of being removed from the filter head along with a filter housing cup, without said filters becoming caught on the filter head in an undesirable manner and, as a result, virtually having to be dismantled separately. This can be achieved, for example, by means of the bayonet catches known from the state of the art, although in some cases these often have the disadvantage of also becoming detached when the filter housing cup is separated from the filter head.

SUMMARY

The present invention is therefore concerned with the problem of specifying an improved or at least alternative embodiment for a filter device of the generic kind which, in particular, overcomes the disadvantages known from the state of the art.

This problem is solved according to the invention by the subject matter of the independent claim(s). Advantageous embodiments are the subject matter of the dependent claim(s).

The present invention is based on the following general principle of providing a specially constructed bayonet catch for fixing a ring filter element to a filter housing cup, wherein driving elements are additionally arranged on the ring filter element, which driving elements interact with ramps and stops on the filter head side in such a manner that, on the one hand, a precisely defined installation position of the ring filter element is forced and, on the other hand, when the filter housing is opened, in other words when the filter housing cup is removed, the ring filter element is reliably held in said filter housing. The filter device according to the invention has a beaker-shaped filter housing cup in this case which is detachably connectable to a filter head. The previously described ring filter element is arranged in the filter housing cup in this case, which ring filter element has a filter material embedded in an upper end plate and a lower end plate. At least two radially outwardly projecting bayonet wings are arranged on the upper end plate of the ring filter element, which bayonet wings interact with recesses arranged on the filter housing cup in the manner of a bayonet catch. According to the invention, the recesses on the longitudinal end side in the circumferential direction in this case define at least a first end position of the bayonet wing guided therein, in the region whereof an undercut contour is provided, in which the bayonet wing is locked, in other words fixed, when the filter device is fitted. At least two driving elements are arranged on the upper end plate of the ring filter element, while a ramp contour with at least two ramps rising in the direction of the driving elements and two stops attached thereto in the circumferential direction is arranged. The ramp contour or else the ramps and stops thereof interacts/interact with the driving elements on the end plate side in this case in such a manner that when the filter device is fitted, the driving elements on the end plate side slide on the ramps to the respective stop and, in so doing, press the ring filter element increasingly into the beaker-shaped filter housing cup, wherein when or after the stops are reached, the bayonet wings are pressed in the first end position in the associated recess into the respective undercut contour. The filter housing cup in this case has, by means of its recesses and the bayonet wings on the ring filter element side guided therein, a securing means and also facilitates via a removal contour a dismantling and fitting position. The ring filter element can be inserted into the filter housing cup via this removal contour in the filter housing cup. The driving elements of the ring filter element guide said ring filter element during installation into the installation position provided therefor, in which the bayonet wings lock in the undercut arranged there in the first respective end position on the longitudinal end side. During dismantling, the ring filter element is turned via the driving elements over the undercut into the removing position, in which the bayonet wings preferably strike against a second end position of the recess. In this position, the filter housing cup can be released from the filter head. The filter housing cup can then be removed from the filter head along with the ring filter element arranged therein, wherein through the axial fixing of the ring filter element in the associated recess via its bayonet wings it is possible to guarantee that the ring filter element is always removed from the filter head along with the filter housing cup. As previously described, counter-contours are arranged on the filter head, namely the ramps with the associated stops which turn the ring filter element into the respective operating or dismantling position. It is possible to guarantee in this case by means of the ramps that the ring filter element is pressed into the undercuts in the operating position and therefore behind a latch attached there and is thereby fixed. The particular advantage of the filter device according to the invention is that the ring filter element can always be removed from the filter head along with the filter housing cup and does not remain there in an undesirable manner.

In an advantageous development of the solution according to the invention, the bayonet wings and/or the driving elements are integrally configured with the upper end plate. This facilitates end plate production that is cost-effective, on the one hand, and of high quality, on the other, for example as a plastic injection molding.

In a further advantageous embodiment of the solution according to the invention, a valve is arranged between the filter head and the ring filter element which is only opened when the ring filter element is fitted. Consequently, if the filter housing cup is connected to the filter had, without a ring filter element being fitted, the valve remains closed and there is no passage of fluid, for example a passage of fuel or oil. The valve provided according to the invention therefore represents a safety valve.

In a further advantageous embodiment of the solution according to the invention, the valve has a tubular valve body with at least one opening on the casing side and a valve slide displaceable thereon, wherein the valve body is locked to the filter head via a latching connection. Through the latching connection, the fitting and also the dismantling of the valve in/from the filter head can be made particularly simple, as this only requires the filter body to be pressed into the associated latching contour of the filter head and locked there or else also detached therefrom once again.

A spring is advantageously provided which, on the one hand, rests against the filter head and, on the other hand, rests against the valve slide, and pretensions the valve slide in the direction of the ring filter element into its closed position. The pretensioning into the closed position is particularly important in this case, as only the installation of a suitable ring filter element should result in the opening of the valve. If no ring filter element of this kind is inserted in the filter housing cup, the valve remains closed and the internal combustion engine cannot be operated.

In a further advantageous embodiment of the solution according to the invention, the valve slide has a radially outwardly extending collar, via which its rests against the upper end plate of the ring filter element. This collar is used in this case as a stop for the upper end plate of the ring filter element, so that when a ring filter element is inserted in the filter housing cup and the filter housing cup is subsequently mounted on the filter head, the ring filter element rests with its upper end plate on the collar of the valve slide and during assembly moves it upwardly into its opening position. In order to guarantee that only authorized ring filter elements are fitted, it is moreover conceivable that between the valve slide, in particular in the region of its collar, and the upper end plate of the ring filter element, a so-called "key-lock contour" is inserted, in other words the valve can only be opened by means of the associated ring filter element insofar as the upper end plate of the ring filter element has a key contour that matches the lock contour arranged on the valve slide. This may, for example, be formed by correspondingly shaped grooves.

In a further advantageous embodiment of the solution according to the invention, the valve body has radially outwardly extending spacer elements which align or position the valve body in the inside of the ring filter element. In this way, a particularly precise installation position can be forced.

Further important features and advantages of the invention result from the dependent claims, the drawings, and the associated figure description in association with the drawings.

It is clear that the features mentioned above and also the features still to be explained below can not only be used in the combination indicated in each case, but also in other combinations or in isolation, without leaving the confines of the present invention.

Preferred exemplary embodiments of the invention are shown in the drawings and are explained in greater detail in the following description, wherein the same reference numbers refer to the same or similar or functionally identical components.

BRIEF DESCRIPTION OF THE DRAWINGS

In the drawing, shown schematically in each case.

DETAILED DESCRIPTION

Figure 1:
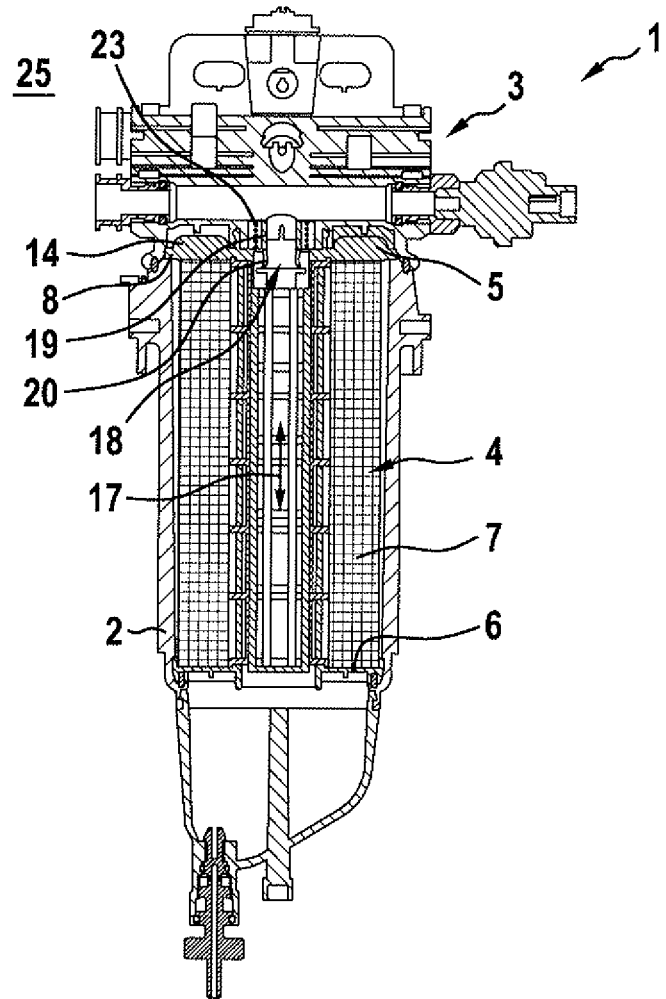
FIG. 1 shows a sectional representation through a filter device according to the invention.
Figure 4:
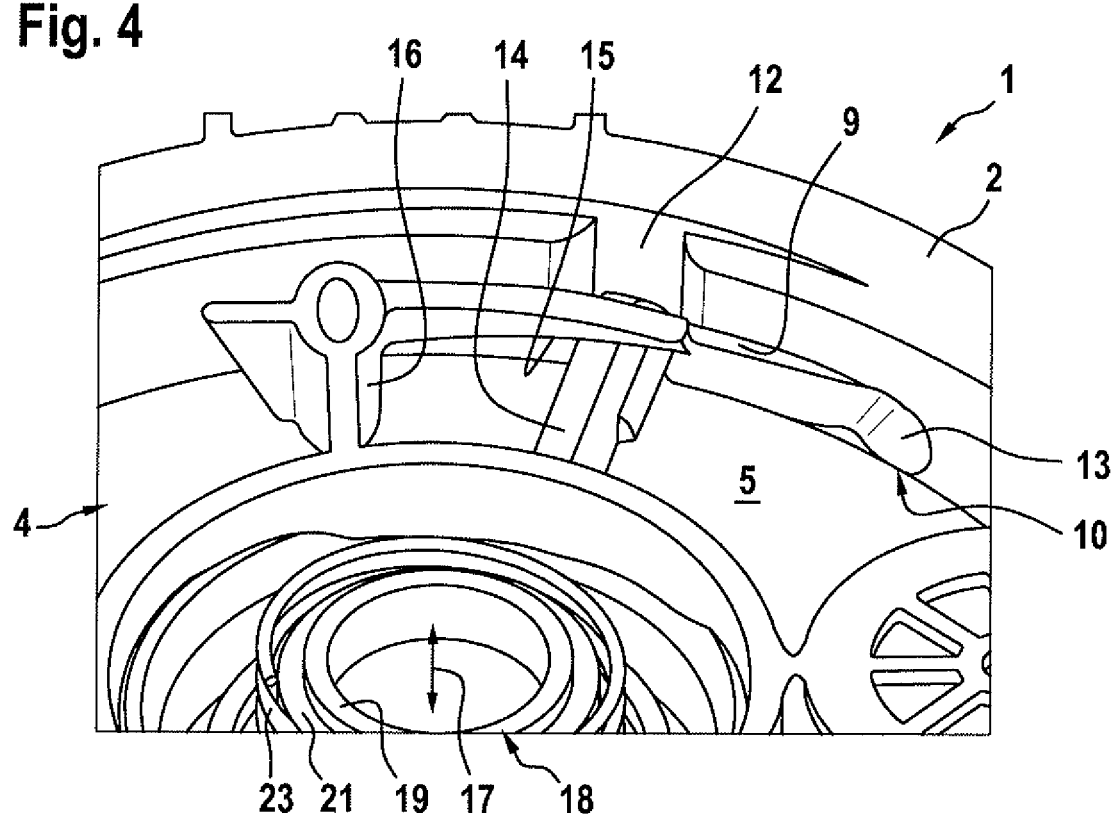
FIG. 4 shows a sectional representation through the filter head in the region of a ramp contour with a ring filter element in an assembled/dismantled position.
Figure 5:
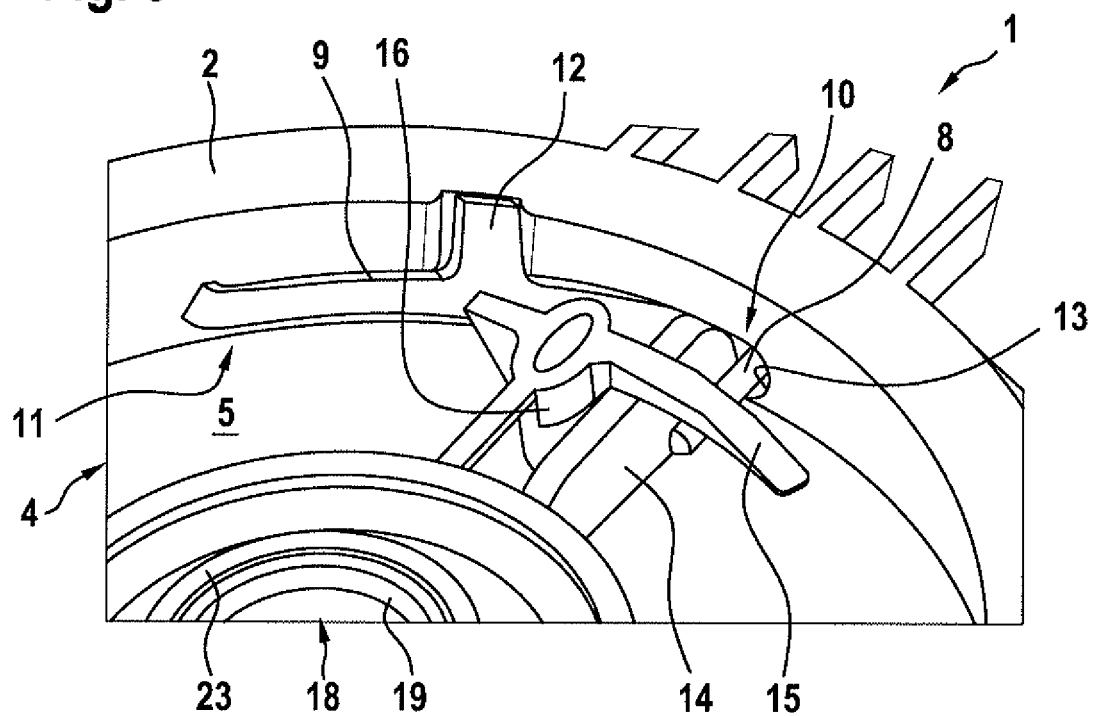
FIG. 5 shows a view as in FIG. 4, but with the ring filter element fitted.
Figure 6:
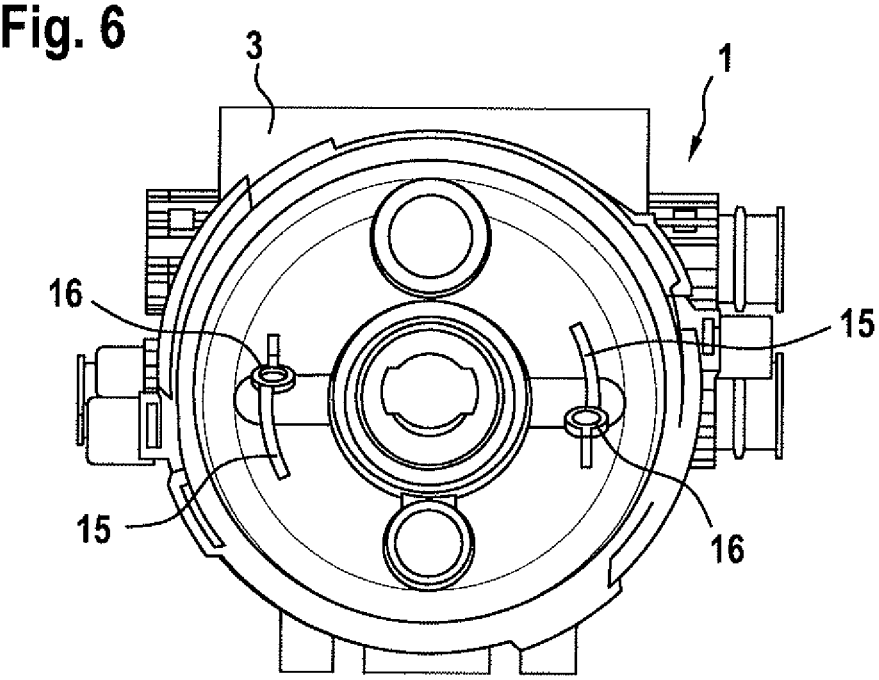
FIG. 6 shows a view from below of the filter head.
Figure 7:
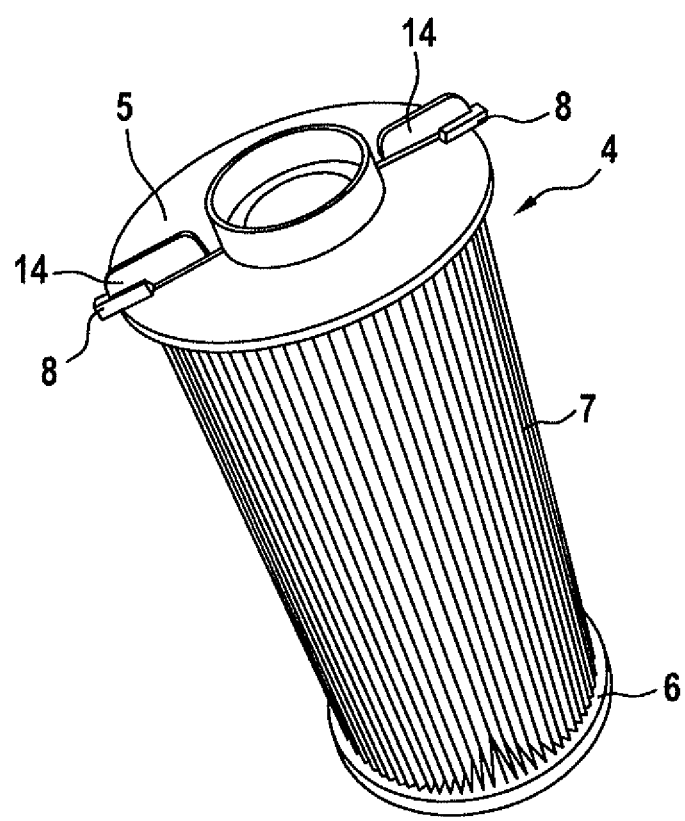
FIG. 7 shows an oblique view of an upper end plate of a ring filter element.

According to FIG. 1, a filter device 1 according to the invention which may be configured as an oil or fuel filter, in particular, has a beaker-shaped filter housing cup 2 (cf. also FIGS. 2 to 5) and a filter head 3 (cf. also FIGS. 4 to 6), wherein a ring filter element 4 (cf. FIG. 7) is arranged in the filter housing cup 2 comprising a filter material 7 embedded in an upper end plate 5 and a lower end plate 6. There are at least two radially outwardly projecting bayonet wings 8 (cf. also FIGS. 2 to 5) arranged on the upper end plate 5 of the ring filter element 4 in this case which interact with recesses 9 arranged on the filter housing cup 2 (cf. FIGS. 2 to 5) in the manner of a bayonet catch. The bayonet wings 8 in this case may be configured as simple pin-shaped radial extensions. The recesses 9 in this case each define in the circumferential direction of the ring filter element 4 a first end position 10 at the longitudinal end and preferably also an opposite second end position 11 of the bayonet wing 8 guided therein, wherein between the first and second end position 10, 11, in other words between the first and second longitudinal end of the recess 9, a removing contour 12 is provided, via which the respective bayonet wing 8 can be introduced into the recess 9 and also removed therefrom once again. Via the removal contour 12, a release of the bayonet catch and therefore removal of the ring filter element 4 from the filter housing cup 2 or an insertion of the ring filter element 4 into the filter housing cup 2 is possible. An undercut contour 13 is provided in the region of the first end position 10 in this case (cf. FIGS. 2 to 5), in which the bayonet wing 8 is fixed when the filter device 1 is mounted. Moreover, at least two driving elements 14 are arranged on the upper end plate 5 of the ring filter element 4. A ramp contour with at least two ramps 15 rising in the direction of the driving elements 14 and two stops 16 is arranged on the filter head 3, said ramps and stops interacting with the driving elements 14 in such a manner that when the filter device 1 is fitted, the driving elements 14 on the end plate side slide on the ramps 15 up to the respective stop 16 and on reaching the stops 16 press bayonet wings 8 into the undercut contours 13 of the associated recess 9 and thereby reliably fix the ring filter element 4 in the filter housing cup 2. The driving elements 14 and the ramps 15 or stops 16 on the filter head side turn the ring filter element into the respective operating or dismantling position during this.

Figure 2:
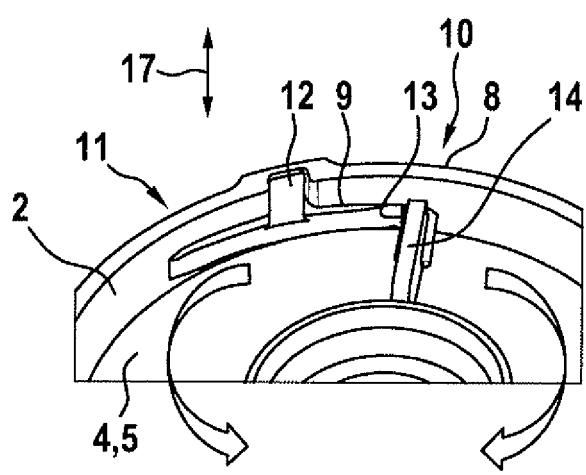
FIG. 2 shows an oblique view from above of a filter housing cup with a ring filter element inserted in the region of a bayonet wing and an associated recess on the filter housing cup side.
Figure 3:
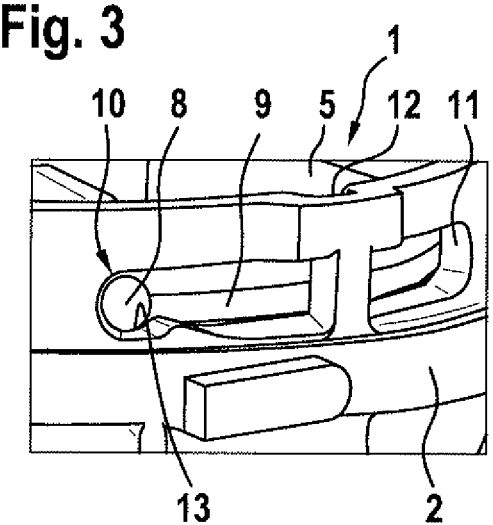
FIG. 3 shows a detail view of the bayonet lock from outside.

By looking at FIG. 2, for example, it can clearly be seen that when the filter housing cup 2 is mounted on the filter head 3 with the ring filter element 4 arranged thereon, the ring filter element 4 is turned clockwise so that the bayonet wing 8 thereof is adjusted in the recess 9 in the direction of the first end position 10. At the same time, the driving element 14 slides along the rising ramp 15 up to the stop 16, as a result of which the bayonet wing 8 is pressed into the undercut contour 13 and locked there. When the filter housing cup 2 is released from the filter head 3, the filter housing cup 2 is rotated counterclockwise, as a result of which the bayonet wing 8 is moved from the first end position 10 in the direction of the second end position 11. Following removal of the filter housing cup 2 from the filter head 3, however, the ring filter element 5 still remains in the filter housing cup 2, as the bayonet wings 8 are still held in the recess 9 in the region of the second end position 11. In order to remove the ring filter element 4 from the filter housing cup 2, the ring filter element 4 must be rotated relative to the filter housing cup 2 in such a manner that the bayonet wings 8 are flush with the removal contour 12 and the ring filter element 4 can thereby be removed from the filter housing cup 2. The ring filter element 4 can be reliably prevented from getting caught on the filter head 3 during the dismantling of the filter housing cup 2 using the bayonet catch according to the invention and the associated ramp contour.

By looking at FIGS. 1, 2, 4, 5 and 7, it can clearly be seen that the driving elements 4 are configured as radial ribs and, in addition, are arranged flush with the bayonet wings 8, wherein the bayonet wings 8 are radially attached to the driving elements 14. The bayonet wings 8 and/or the driving elements 14 in this case can be integrally configured with the upper end plate 5 and therefore produced cost-effectively. By looking at FIGS. 2 to 5, it can clearly be seen that the removal contours 12 run in the axial direction 17 of the filter device 1.

Figure 8A:
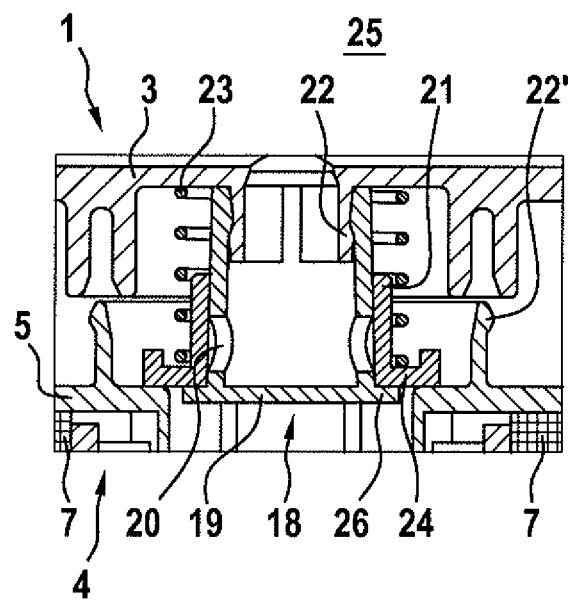
FIG. 8A shows a sectional representation through the filter device according to the invention in the region of a centrally arranged valve with the valve closed.
Figure 8B:
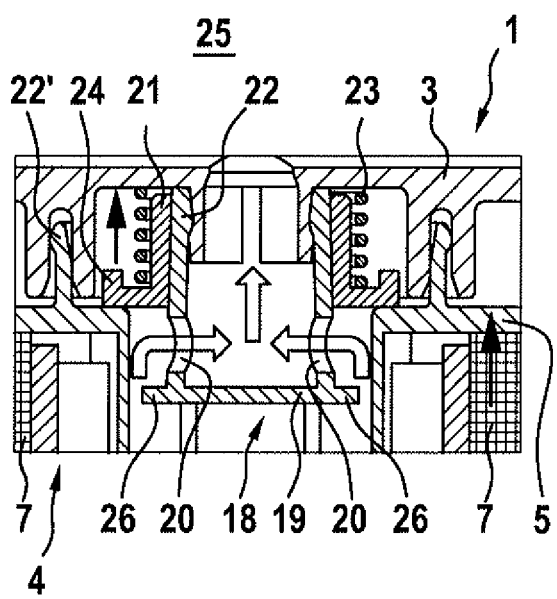
FIG. 8B shows a depiction as in FIG. 8A but with the valve opened.
Figure 9A:
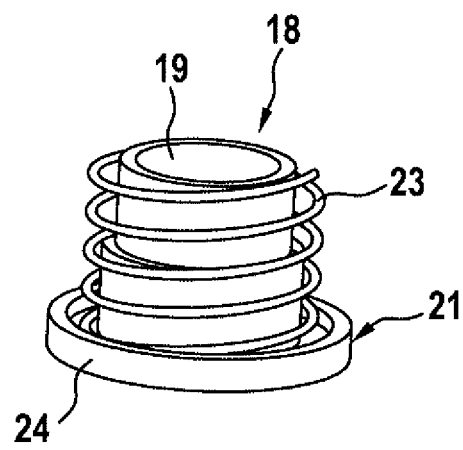
FIG. 9A shows a partial depiction of the valve in the closed state.
Figure 9B:
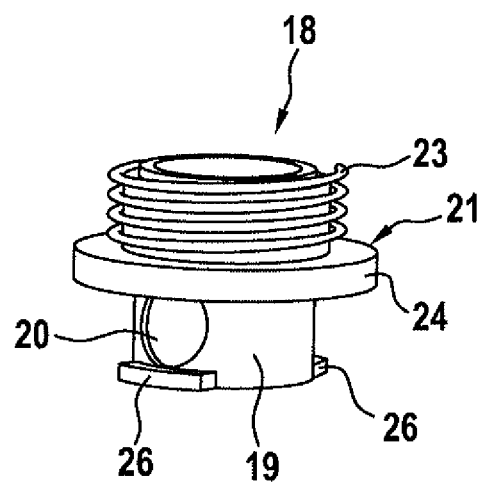
FIG. 9B shows a depiction of the valve in the open position.

So that the mode of operation of the filter device 1 according to the invention can be additionally safeguarded, a valve 18 (cf. FIGS. 8A, 8B, 9A and 9B) is arranged between the filter head 3 and the ring filter element 4 which is only open when the ring filter element 4 is installed, in other words when the filter device 1 is in the operating state (cf. FIGS. 8B and 9B). The valve 18 itself has a tubular valve body 19 in this case with at least one opening 20 on the casing side and a valve slide 21 displaceable thereon. By looking at FIGS. 8A and 8B, for example, it can be seen that the valve 18 is locked to the filter head 3 via a latching connection 22. Via a further latching connection 22' the upper end plate 5, in other words the ring filter element 4, can also be connected to the filter head 3. By means of the latching connection 22, the valve 18 can be secured to the filter head 3, or else released therefrom again, comparatively simply.

Furthermore, by looking at FIGS. 8A, 8B, 9A, and 9B, it can be seen that the valve 18 also has, in addition, a spring 23 which, on the one hand, rests against the filter head 3 and, on the other hand, against the valve slide 21 (cf. FIGS. 8A and 8B) and pretensions the valve slide 21 in the direction of the ring filter element 4 and therefore into its closed position. When the filter device 1 is mounted, the valve body 21 engages with an inner space of the ring filter element 4, as is depicted according to FIG. 8B, for example. Moreover, the valve slide 21 has a radially outwardly projecting collar 24, via which it rests against the upper end plate 5 of the ring filter element 4.

When the ring filter element 4 is installed in the filter device 1, this is initially pressed with the filter housing cup 2 from below against the filter head 3 and the filter housing cup 2 can then be screwed with the filter head 3, for example. Through a slow upward movement of the ring filter element 4, said element rests via the end plate 5 thereof on the collar 24 of the valve slide 21 and presses it upwards until it releases the openings 20 in the valve body 19 on the casing side and an outflow of purified fluid is thereby made possible. If due to an oversight, for example, no ring filter element 4 is inserted in the filter housing cup 2, although the filter housing cup 2 can be connected to the filter head 3, the missing ring filter element 4 means, however, that there is no opening of the valve 18 and therefore no fluid passage through the filter device 1 according to the invention, as a result of which, for example, an internal combustion engine 25 connected thereto does not start.

A substantial assembly advantage can be achieved with the filter device 1 according to the invention, since during a dismantling of the ring filter element 4 this can initially be reliably taken off the filter head 3 along with the filter housing cup 2 and only subsequently removed therefrom. Accidental and unwanted sticking of the ring filter element 4 on the filter head 3 can be reliably avoided by means of the bayonet catch and the ramps 15 and stops 16 on the filter head side. In addition, the valve body 19 has radially outwardly projecting spacer elements 26 which orient or position the valve body 19 in the inside of the ring filter element 4, as is depicted according to FIGS. 8A, 8B, 9A, and 9B.

The invention claimed is:

1. A filter device comprising:
   a filter housing cup, a filter head, and a ring filter element arranged in the filter housing cup, the ring filter element including an upper end plate on which at least two radially outward projecting bayonet wings are arranged which interact with a plurality of recesses disposed in the filter housing cup, each of the plurality of recesses structured as a bayonet catch;
   the plurality of recesses, at a respective longitudinal end side in a circumferential direction of the filter housing cup, respectively defining a first end position of an associated bayonet wing of the at least two bayonet wings;
   the plurality of recesses respectively defining an undercut contour in a region of the first end position, in which the associated bayonet wing is engaged when the filter device is fitted;
   at least two driving elements arranged on the upper end plate of the ring filter element; and at least two stops and at least two ramps arranged on the filter head, the at least two ramps rising in a direction of the at least two driving elements; and wherein the at least two ramps and the at least two stops are structured and arranged such that, when fitting the filter device, the at least two driving elements, each slide on one of the at least two ramps to a respective stop of the at least two stops and, having reached the at least two stops, press the at least two bayonet wings into the undercut contour of an associated recess of the plurality of recesses.

2. The filter device as claimed in claim 1, wherein the plurality of recesses each define, at a respective second longitudinal end side in the circumferential direction, a second end position of the associated bayonet wing, and wherein a removing contour is arranged between the first end position and the second end position defined by each of the plurality of recesses via which the associated bayonet wing is introducable into and removable from the associated recess.

3. The filter device as claimed in claim 1, wherein at least one of:
the at least two driving elements are structured as radial ribs; and
the at least two driving elements are arranged flush with the at least two bayonet wings in a radial direction of the filter housing cup.

4. The filter device as claimed in claim 1, wherein at least one of i) the at least two bayonet wings and ii) the at least two driving elements are arranged integrally on the upper end plate.

5. The filter device as claimed in claim 2, wherein the removing contour of at least one of the plurality of recesses extends in an axial direction of the filter device.

6. The filter device as claimed in claim 1, further comprising a valve arranged between the filter head and the ring filter element which is only opened when the ring filter element is fitted.

7. The filter device as claimed in claim 6, wherein the valve includes a tubular valve body including at least one opening on a casing side and a valve slide displaceable thereon.

8. The filter device as claimed in claim 7, wherein the valve body is coupled to the filter head via a latching connection.

9. The filter device as claimed in claim 7, further comprising a spring which rests against the filter head and rests against the valve slide, and pretensions the valve slide in a direction of the ring filter element into a closed position.

10. The filter device as claimed in claim 7, wherein at least one of:
when the filter device is mounted, the valve body engages with an inner space of the ring filter element; and
the valve slide includes a radially outward projecting collar via which the valve slide rests against the upper end plate of the ring filter element.

11. The filter device as claimed in claim 7, wherein the valve body further includes radially outward extending spacer elements structured to align the valve body in an inside of the ring filter element.

12. A filter device comprising:
a filter housing cup including a plurality of recesses respectively structured as a bayonet catch;
a filter head;
a ring filter element arranged in the filter housing cup, the ring filter element including an upper end plate;

at least two driving elements arranged on the upper end plate of the ring filter element;
at least two radially outward projecting bayonet wings arranged on the upper end plate, each of the at least two bayonet wings configured to interact with an associated recess of the plurality of recesses;
the plurality of recesses respectively defining a first end position of an associated bayonet wing of the at least two bayonet wings at a respective longitudinal end side in a circumferential direction of the filter housing cup, and a second end position of the associated bayonet wing at a respective second longitudinal end side in the circumferential direction;
the plurality of recesses respectively defining an undercut contour in a region of the first end position, the associated bayonet wing engaged within the undercut contour when the filter device is fitted;
wherein at least two stops and at least two ramps are arranged on the filter head, the at least two ramps rising in a direction of the at least two driving elements;
wherein the at least two stops and the at least two ramps are structured and arranged such that, when fitting the filter device, the at least two driving elements each slide on one of the at least two ramps to a respective stop of the at least two stops and press the at least two bayonet wings into the undercut contour of the associated recess; and
wherein the filter housing cup further includes a plurality of removing contours respectively extending, in an axial direction of the filter device, into one of the plurality of recesses between the first end position and the second end position defined thereby via which the associated bayonet wing is insertable and removable from the associated recess.

13. The filter device as claimed in claim 12, wherein the at least two driving elements are structured as radial ribs.

14. The filter device as claimed in claim 12, wherein the at least two driving elements are arranged flush with the at least two bayonet wings in a radial direction of the filter housing cup.

15. A filter device comprising:
a filter housing cup including a plurality of recesses respectively structured as a bayonet catch;
a filter head;
a ring filter element arranged in the filter housing cup, the ring filter element including an upper end plate;
a valve arranged between the filter head and the ring filter element which is only opened when the ring filter element is fitted;
at least two driving elements arranged on the upper end plate of the ring filter element;
at least two radially outward projecting bayonet wings arranged on the upper end plate, each of the at least two bayonet wings configured to interact with an associated recess of the plurality of recesses;
the plurality of recesses respectively defining a first end position of an associated bayonet wing of the at least two bayonet wings at a respective longitudinal end side in a circumferential direction of the filter housing cup, and a second end position of the associated bayonet wing at a respective second longitudinal end side in the circumferential direction;
the plurality of recesses respectively defining an undercut contour in a region of the first end position, the associated bayonet wing engaged within the undercut contour when the filter device is fitted;

wherein at least two stops and at least two ramps are arranged on the filter head, the at least two ramps rising in a direction of the at least two driving elements; and wherein the at least two stops and the at least two ramps are structured and arranged such that, when fitting the filter device, the at least two driving elements each slide on one of the at least two ramps to a respective stop of the at least two stops and press the at least two bayonet wings into the undercut contour of the associated recess.

16. The filter device as claimed in claim 15, wherein the valve includes a tubular valve body including at least one opening on a casing side and a displaceable valve slide.

17. The filter device as claimed in claim 16, further comprising a spring pretensioning the valve slide in a direction of the ring filter element into a closed position, the spring arranged between and resting against the filter head and the valve slide.

18. The filter device as claimed in claim 16, wherein the valve body engages an inner space of the ring filter element when the filter device is mounted.

19. The filter device as claimed in claim 16, wherein the valve slide includes a radially outward projecting collar via which the valve slide rests against the upper end plate of the ring filter element.

20. The filter device as claimed in claim 16, wherein the valve body further includes radially outward extending spacer elements structured to align the valve body in an inside of the ring filter element.

* * * * *